United States Patent
Rosenblum et al.

(10) Patent No.: US 10,533,803 B2
(45) Date of Patent: Jan. 14, 2020

(54) STERILE APPARATUS FOR RAPID COOLING OF HOT WATER

(71) Applicants: Reut Rosenblum, Petah Tikva (IL); Yedidya Yochai Van Dijk, Yakir (IL); Mely Rosenbloom, Bnei Brak (IL)

(72) Inventors: Reut Rosenblum, Petah Tikva (IL); Yedidya Yochai Van Dijk, Yakir (IL); Eli Rozenblum, Bnei Brak (IL)

( * ) Notice: Subject to any disclaimer, the term of this patent is extended or adjusted under 35 U.S.C. 154(b) by 0 days.

(21) Appl. No.: 16/513,724

(22) Filed: Jul. 17, 2019

(65) Prior Publication Data

US 2019/0339011 A1  Nov. 7, 2019

Related U.S. Application Data

(63) Continuation-in-part of application No. 16/252,603, filed on Jan. 19, 2019, now abandoned, which is a continuation-in-part of application No. 15/505,651, filed as application No. PCT/IL2016/050446 on May 1, 2016, now abandoned.

(30) Foreign Application Priority Data

May 10, 2015 (IL) ............................ 238731

(51) Int. Cl.
 *F28D 1/02* (2006.01)
 *A47J 41/00* (2006.01)
 *F28D 21/00* (2006.01)

(52) U.S. Cl.
 CPC ........ *F28D 1/0213* (2013.01); *A47J 41/0044* (2013.01); *F25D 2303/082* (2013.01); *F25D 2303/0842* (2013.01); *F28D 2021/0042* (2013.01)

(58) Field of Classification Search
 CPC .... F28D 1/0213; F28D 1/0535; F28D 7/1684; F28D 2021/0042; A47G 19/127; A47G 19/2205; A47G 19/2272; A47G 19/2288; F25D 3/08; F25D 2303/08221; F25D 2303/0842; F25D 3/06; F25D 2331/8051; F28F 9/001; F28F 2220/00; B65D 81/18; B65D 81/3484; B65D 81/38; B65D 81/3813; B65D 1/265; B65D 81/3865; B65D 81/3862
 USPC .......... 165/157; 220/592.17, 592.01, 592.16, 220/592.2, 592.23
 See application file for complete search history.

(56) References Cited

U.S. PATENT DOCUMENTS 2,496,296 A * 2/1950 Lobl ...................... A45C 11/20
  62/329
2012/0312521 A1* 12/2012 Zebuhr .................... F25D 3/08
  165/287

* cited by examiner

*Primary Examiner* — Justin M Jonaitis

(57) ABSTRACT

An apparatus for cooling liquids that includes a tank that has two longitudinal walls, two lateral walls and a bottom, and cooling flasks that each of them has two longitudinal walls, two lateral walls and a bottom. The flasks are designed to contain coolant. The lateral walls and at least one longitudinal wall of each flask has at least one protrusion smaller than 2.5 millimeters. The flasks are designed to be set within the tank in such a way that the protrusions are attached to the longitudinal walls of the tank. The protrusions create a gap smaller than 2.5 millimeters between each two adjacent flasks and between the lateral walls of the flasks to the longitudinal walls of the tank. These gaps constitute a single cooling space. The total volume of the flasks is three times greater or more than the volume of the single cooling space.

6 Claims, 7 Drawing Sheets

STERILE APPARATUS FOR RAPID COOLING OF HOT WATER

RELATED APPLICATIONS

This application is a continuation in part of U.S. patent application Ser. No. 16/252,603 filed on Jan. 19, 2019 which is a continuation in part of U.S. patent application Ser. No. 15/505,651 filed on Feb. 22, 2017 which is a National Phase of PCT patent application number PCT/IL2016/050446 having International filing date of 1 May 2016, which claims the benefit of priority of IL patent application number 238731 filed on 10 May 2015. The contents of the above applications are all incorporated by reference as if fully set forth herein in their entirety.

TECHNICAL FIELD

The present invention refers to a sterile apparatus for the rapid cooling of hot water.

BACKGROUND ART

It is often necessary to boil liquids before using them in order to prevent contamination, and then cool them down to a temperature that is suitable for drinking. For example, when preparing milk substitutes for babies, the water must first be boiled in order to prevent contamination, and then cooled down to a temperature that is suitable for feeding the baby. It is of course desirable that the procedure of cooling the water to the desired temperature be sterile. In general, it is commonly accepted that the parent pours the boiling water into the feeding bottle, and waits a relatively long time for the contents to cool. Sometimes the parent places the feeding bottle with the boiled water in a vessel that is filled with tap water, in order to hasten the cooling, although this still requires a long period of time to cool the contents. The present invention offers a good and effective solution to the aforementioned problem, and for a variety of other cases in which there is a need for the rapid, sterile cooling of very hot liquids.

U.S. patent application 2012/0312521 ("Application 521") discloses a beverage cooling device comprising relatively many parts including several cooling portions, which assembled one into the other. The structure of the device of Application 521 is cumbersome, expensive for manufacturing and not easy for cleaning, relatively to the apparatus subject matter of the present invention.

DESCRIPTION OF THE DRAWINGS

The intention of the drawing attached to the application is not to limit the scope of the invention and its application. The drawing is intended only to illustrate the invention and it constitutes only one of its many possible implementations.

THE INVENTION

The main objective of the present invention is to provide an apparatus (1) that enables to cool hot fluids within a relatively very short time. Another objective of the present invention is to provide an apparatus as mentioned that enables to cool liquids as mentioned while maintaining the sterility of the cooled liquids. For the sake of fluency of the text, the term "water" will refer to water as well as to a variety of other liquids, and the expression "boiled water" will also refer to hot water.

Figure 1:
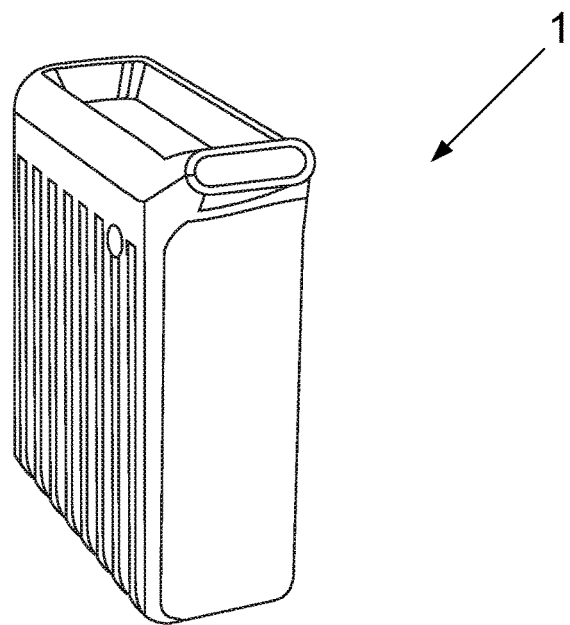
FIG. 1 depicts the cooling apparatus (1) in its closed state, ready for use.
Figure 2:
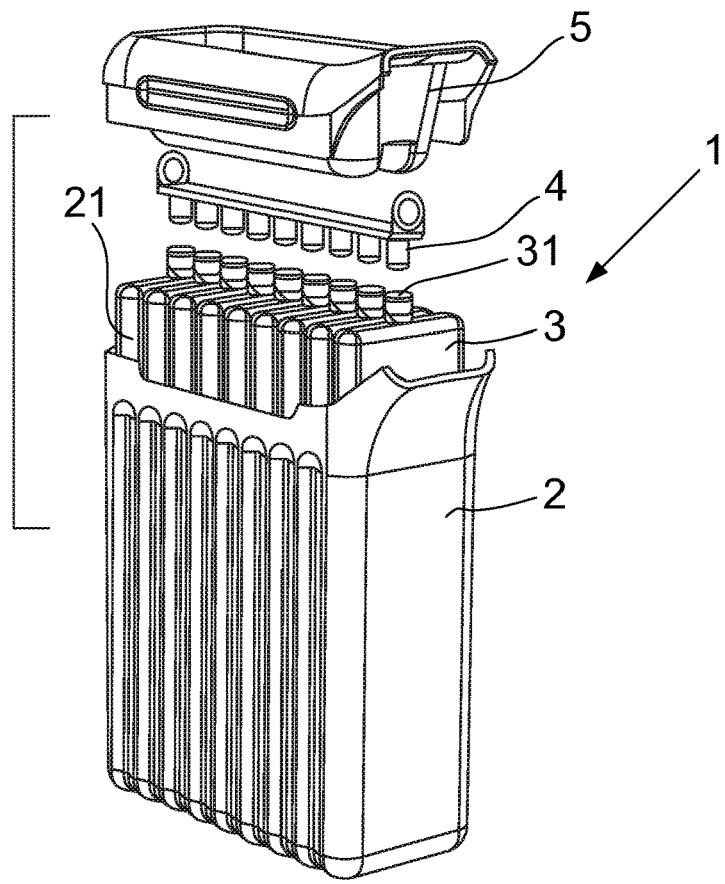
FIG. 2 presents an exploded view of the apparatus (1), showing the tank (2) the cooling flasks (3) the stoppers manifold (4), and the pouring receptacle (5).
Figure 3:
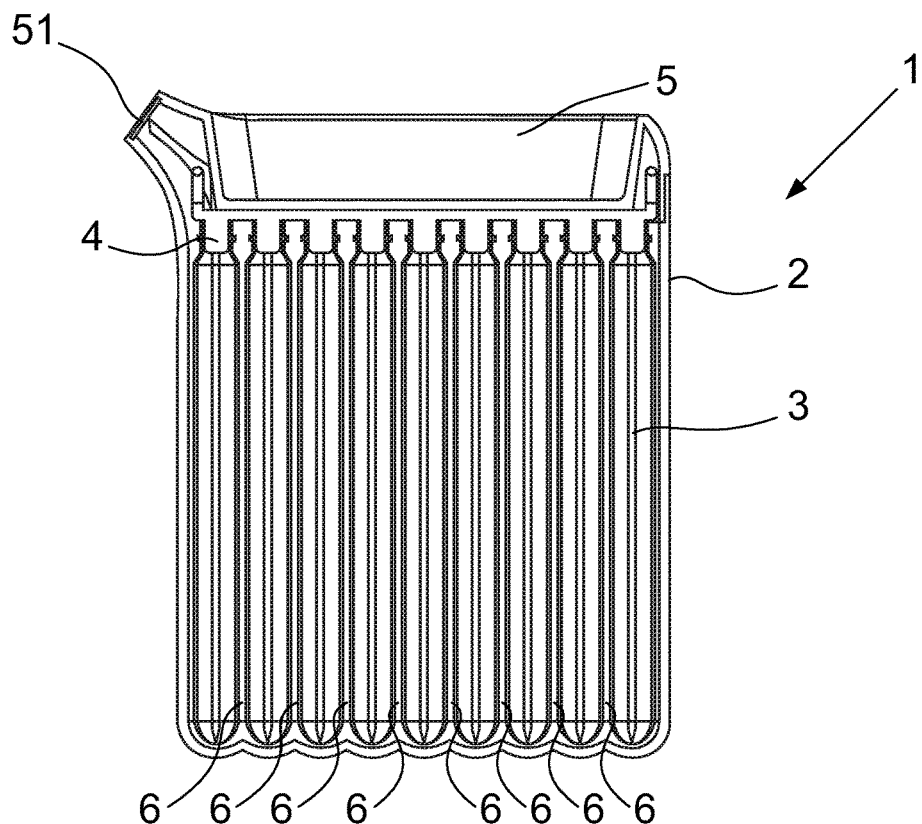
FIG. 3 presents a sectioned side view of the apparatus (1), showing the gaps (6).

The apparatus for cooling hot water (1) consists of an external tank (2) and several internal cooling flasks (3). In addition, the apparatus (1) may include stoppers or a stoppers manifold (4) and a pouring receptacle (5). FIG. 1 depicts the apparatus (1) in its assembled state. FIG. 2 presents an exploded view of the apparatus (1) and the way in which its components are integrated. FIG. 3 presents a sectioned side view of the apparatus (1).

The tank (2) is closed on the bottom and on its circumferential sides, and has a top opening (21). The cooling flasks (3) are relatively narrow containers with a top opening (31). The apparatus (1) comprises several cooling flasks (3), at least three, positioned very close to one another within the external tank (2), as depicted, for instance, in FIGS. 2 and 3. The cooling flasks (3) should contain coolant, which can be either regular tap water or any other coolant.

The top openings (31) of the flasks (3) may be permanently closed after being filled with coolant. Alternatively, the openings (31) may be closed with stoppers (4) in a way that enables the user to fill and empty the coolant contents. Stoppers (4) may be individual such that each stopper closes one opening (31) or they can comprise a stoppers manifold (4) that closes all of the openings (31) at once, as depicted for example in the drawings. As mentioned, the apparatus (1) may be equipped with a pouring receptacle (5) that can be designed as a kind of basin with a bottom opening (51). The pouring receptacle may also serve as a top cover for the tank (2). In principle, the apparatus (1) does not have to be equipped with a pouring receptacle.

The gaps (7) between one cooling flask (3) and another constitute a fundamental element of the invention, subject of the present patent application. The cooling flasks (3) are set within the tank (2) in such a way that a very narrow gap (7) is left between each cooling flask (3) and the next cooling flask (3) adjacent to it. Thus, almost the entire volume of the tank (2) is occupied by the volume of the internal cooling flasks (3). FIGS. 2-5 illustrate the way in which the cooling flasks (3) can be positioned within the tank (2). The gap (7) between each two adjacent cooling flasks (3) is smaller than 2.5 millimeters, although the invention covers both larger and smaller dimensions as well.

The cooling space (6): Setting the cooling flasks (3) in the external tank (2) according to the aforementioned structure leaves very narrow spaces between the flasks (3). These narrow spaces constitute the cooling space (6). A variety of fixing means may be used (22) (33) to fix the cooling flasks (3) inside the external tank (2) so that very narrow gaps (7) exist between them, thus forming the cooling space (6).

The fixing means may be, for example, as depicted in the drawings, whereby the inner wall of the tank (2) has recesses (22) that match the lateral rounded side (33) of the flasks (3). The spaces between the flasks (3) create a single space that constitutes the cooling space (6), which may either be closed and have a top opening, or be completely open on top.

The internal cooling space (6) constitutes a space for quick and effective cooling, since its surface area is relatively very large. The structure of the cooling space (6) enables the coolant fluid in the cooling flasks (3) to quickly adsorb the heat. Thus, a relatively small volume of boiled water is poured into the cooling space, filling the very narrow gaps between the cooling flasks. The large contact area between the boiled water and the walls of the cooling flasks (3) leads to rapid cooling of the boiled water. After boiled water is poured into the apparatus (1), its temperature plummets to the desired temperature within a very short period of time.

Using the apparatus (1): If the apparatus (1) is equipped with stoppers (4) that enable the user to fill it with coolant such as tap water, and a pouring receptacle (5), as described above, then the apparatus (1) is used in the following way: the cooling flasks (3) are filled with tap water or another coolant, and are then closed with the stoppers (4). The tank (2) is then covered with the pouring receptacle (5). The boiled water is poured into the pouring receptacle (5) and flows into the internal cooling space (6). After a very short period of time, the water in the cooling space (6) may be poured out, simply by tilting the apparatus (1). The water that is cooled in the apparatus (1) is stationary during the cooling process and does not have to be circulated.

The structure of the apparatus components enables quick access to all component parts for quick and easy cleaning and disinfection, a very important aspect in the preparation of baby food. The apparatus components can be made from a wide variety of materials, even materials that are not especially good conductors of heat. For example, components may be manufactured from polypropylene, which meets strict standards with regard to food and beverage containers. The apparatus may come in a variety of sizes. For example, an apparatus designed for cooling boiled water used in the preparation of milk substitutes for babies may include an internal cooling space (6) with a volume in the order of 200 ml.

Figure 4:
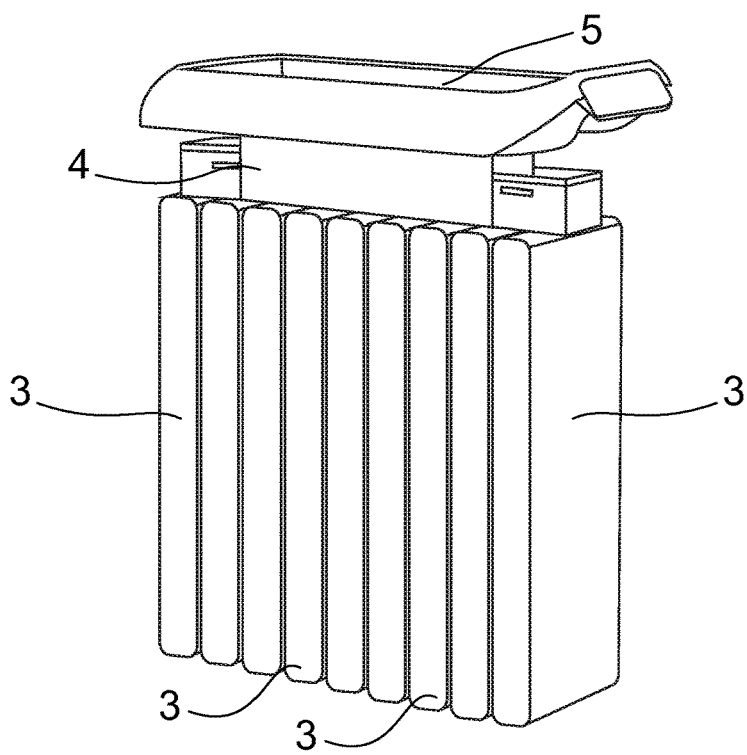
FIG. 4 depicts the way in which the pouring receptacle (5) is mounted on the stoppers manifold (4) that closes the cooling flasks (3).
Figure 5:
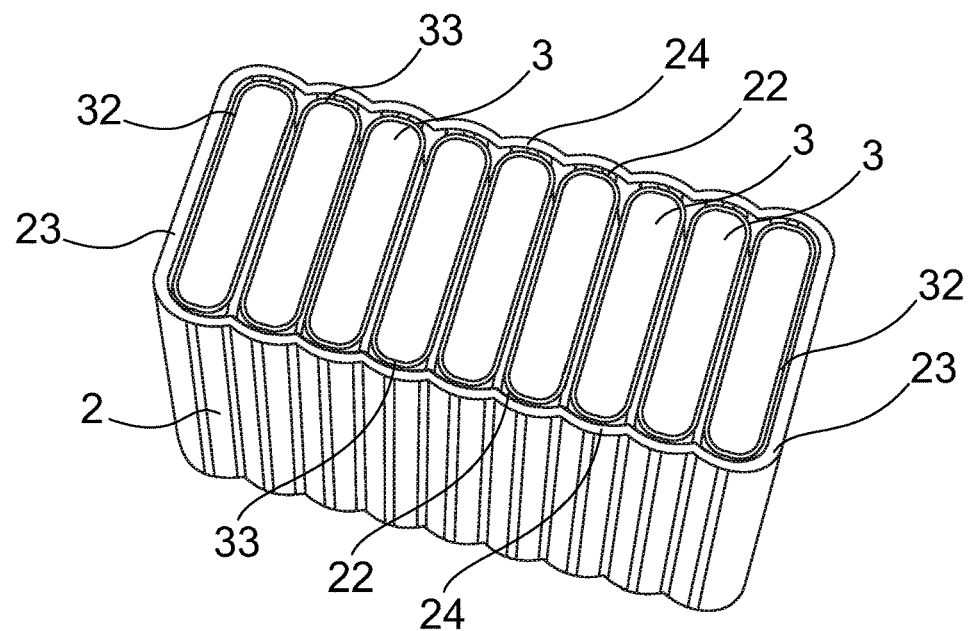
FIG. 5 presents a sectioned top view of the cooling flasks (3), and the way in which they fit into the tank (2).
Figure 6:
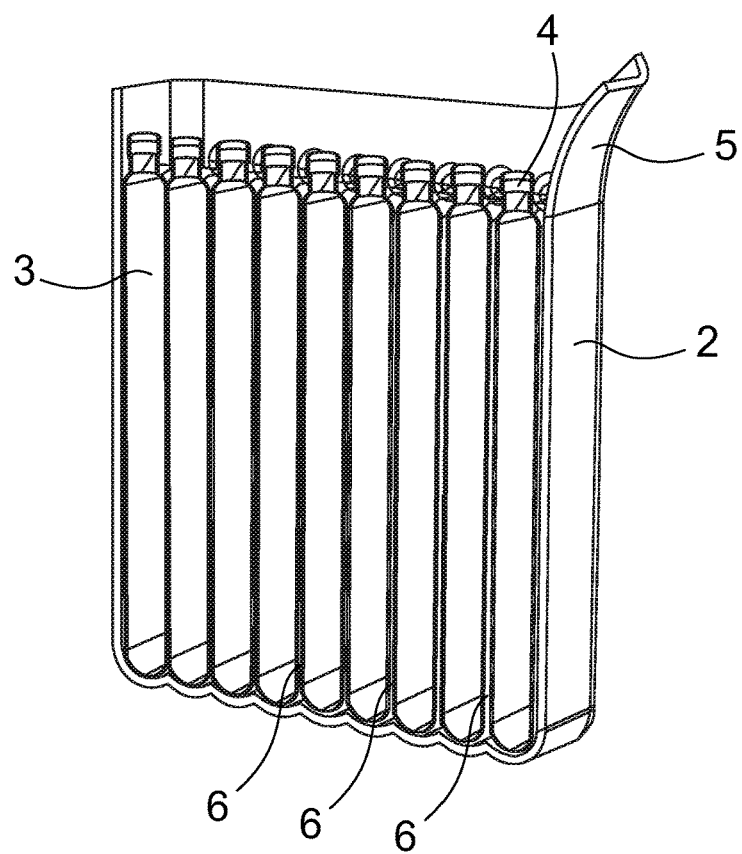
FIG. 6 is a sectioned side view of the tank (2) into which the flasks are inserted (3) and closed by the stoppers manifold (4), and of the way in which the pouring receptacle (5) closes the tank (2).
Figure 7:
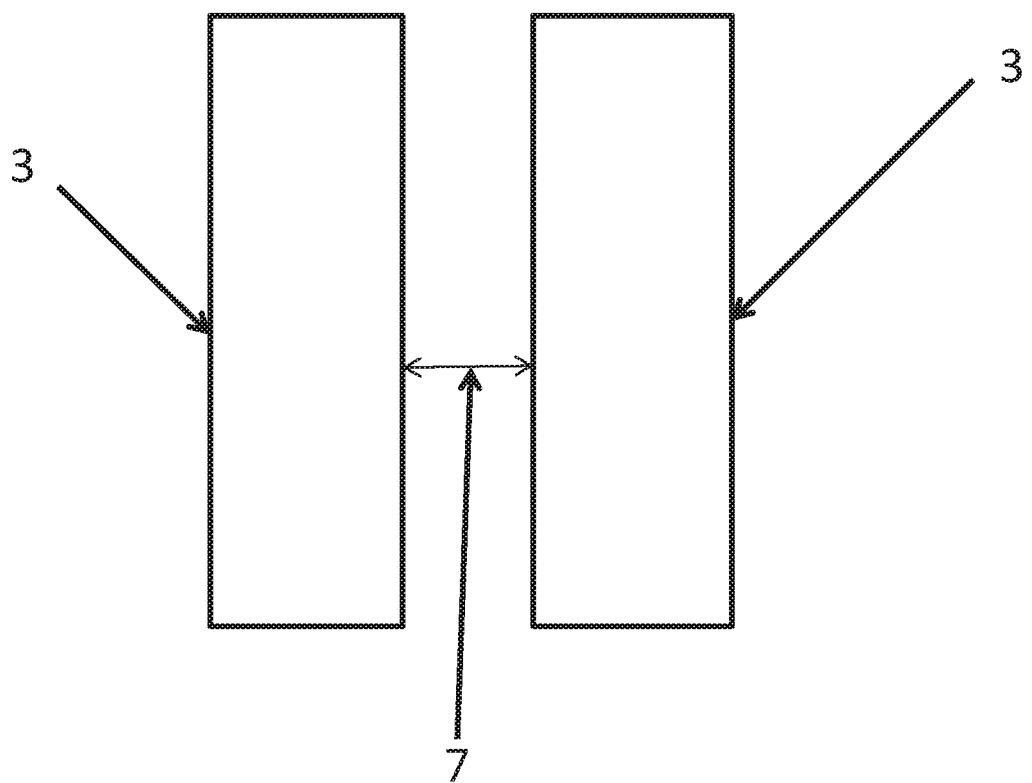
FIG. 7 is a schematic illustration of the gap (7) between two cooling flasks (3).

FIG. 1 depicts the cooling apparatus (1) in its closed state, ready for use. FIG. 2 presents an exploded view of the apparatus (1) that shows the tank (2), the flasks (3), the stoppers manifold (4) and the pouring receptacle (5), and the way in which they are integrated. FIG. 3 presents a sectioned side view of the apparatus (1) showing the cooling space (6). FIG. 4 depicts the way in which the pouring receptacle (5) is mounted on the stoppers manifold (4) that closes the cooling flasks (3). FIG. 5 presents a sectioned top view of the cooling flasks (3), and the way in which they fit into the tank (2). FIG. 6 is a sectioned side view of the tank (2) into which the flasks are inserted (3) and closed by the stoppers manifold (4), and of the way in which the pouring receptacle (5) closes the external tank (2). FIG. 7 is a schematic illustration of the gap (7) between two cooling flasks (3).

As it is understood from the above explanations and the drawings the apparatus (1) for cooling liquids comprises a tank (2) and cooling flasks (3). The tank (2) has two longitudinal walls (24), two lateral walls (23) and a top opening (21). Each cooling flasks has two longitudinal walls (32) and two lateral walls (33) and these cooling flasks are designed to contain coolant material.

The longitudinal wall (24) of the tank (2) has recesses (22) that match the shape of the lateral walls (33) of the cooling flasks (3). Each cooling flasks is designed to be fixed inside the tank by attaching the lateral walls of each cooling flasks to the recesses.

The cooling flasks are designed to be set within the tank in such a way that a gap (7) smaller than 2.5 millimeters is formed between each two adjacent cooling flasks, creating a cooling space (6). The total volume of the cooling flasks is three times greater or more than the total volume of the cooling space (6). For example, the best way is to have a proportion of 200 cc of cooling space and 800 cc total volumes of the cooling flasks. This structure enables the user to cool 200 cc of boiled water in a short time by using 800 cc of tap water (inside the cooling flasks). This structure enables the user to pour hot water into the cooling space (6) and the coolant material within the cooling flasks will adsorb heat from the hot water.

The second embodiment of the apparatus (1) is in general similar to the embodiment which is described above with the following differences: the tank does not include recesses and the shape of the lateral walls (33) of the cooling flasks (3) are irrelevant. The gaps (7) between each two adjacent cooling flasks (7), are created by protrusions (38) on the longitudinal walls (32), the lateral walls (33) and bottoms (39) of the cooling flasks (3). The height of these protrusions (38) is smaller than 2.5 millimeters.

The second embodiment of the apparatus (1) for cooling liquids includes a tank (2) and cooling flasks (3). The tank (2) has two longitudinal walls (24), two lateral walls (23), a bottom (29) and a top opening (21). Each of said cooling flasks (3) has two longitudinal walls (32), two lateral walls (33) and a bottom (39). The cooling flasks (3) are designed to contain the coolant material, for example cold tap water.

The lateral walls (33), the bottom (39) and at least one longitudinal wall (32) of each of said cooling flasks (3) has at least one protrusion (38) smaller than 2.5 millimeters. The cooling flasks (3) are designed to be set inside the tank (2) in such a way that said protrusions (38) are attached to the longitudinal walls (24) and to the bottom (29) of the tank (2), any may also attached to the lateral walls (23) of the tank (2).

The protrusions (38) create gaps (7) smaller than 2.5 millimeters between each two adjacent cooling flasks (3), between the bottoms of said cooling flasks (3) to the bottom (29) of said tank (2), and between the lateral walls (33) of said cooling flasks (3) to the longitudinal walls (24) of said tank (2). These gaps (7) constitute a single cooling space (6). The total volume of the cooling flasks (3) is three times greater or more than the total volume of the single cooling space (6). When a user pours hot water into the single cooling space then the coolant material within said cooling flasks adsorbs heat from said hot water.

Another version of the second embodiment of the apparatus (1) includes the tank (2) and the cooling flasks (3). Each of said bottom (29) and said longitudinal walls (24) of said tank (2), and at least one longitudinal wall (32) of each cooling flasks (3), has at least one protrusion (38) smaller than 2.5 millimeters. The cooling flasks (3) are designed to be set within the tank (2) in such a way that said protrusions (38) are attached to the lateral walls (33) and the bottoms

(39) of said cooling flasks (3). Wherein said protrusions (38) create the gap (7) that is smaller than 2.5 millimeters between each two adjacent cooling flasks (3), between the bottoms (39) of said cooling flasks (3) to the bottom (29) of said tank (2), and between the lateral walls (33) of said cooling flasks (3) to the longitudinal walls (24) of said tank (2), wherein said gaps (7) constitute the single cooling space (6).

Additional version of the second embodiment of the apparatus (1) includes the tank and the cooling flasks. At least one longitudinal wall of each of said cooling flasks has at least one protrusion smaller than 2.5 millimeters. The cooling flasks are designed to be set within the tank in such a way that said protrusions create a gap smaller than 2.5 millimeters between each two adjacent cooling flasks, wherein said gaps constitute the single cooling space.

As stated above, the first embodiment of the apparatus for cooling liquids includes the tank and the cooling flasks. The tank has two longitudinal walls, two lateral walls and a top opening. Each of said cooling flasks has two longitudinal walls and two lateral walls. The cooling flasks are designed to contain the coolant material.

Each of said longitudinal walls of said tank has recesses wherein each of said recesses match a shape of said lateral walls of said cooling flasks. Each of said cooling flasks is designed to be fixed inside the tank by attaching the lateral walls of each cooling flasks to corresponding recesses from said recesses. The cooling flasks are designed to be set within the tank in such a way that the gap which is smaller than 2.5 millimeters is formed between each two adjacent cooling flasks, creating the cooling space. Wherein the total volume of the cooling flasks is three times greater or more than the total volume of the cooling space. Whereby when a user pours hot water into the single cooling space then the coolant material within said cooling flasks adsorbs heat from said hot water.

In another version of the first embodiment of the apparatus (1) the lateral walls (33), the bottom (39) and at least one longitudinal wall (32), of each of said cooling flasks (3), has at least one protrusion (38) smaller than 2.5 millimeters. The cooling flasks (3) are designed to be set within the tank (2) in such a way that said protrusions (38) are attached to the longitudinal walls (24) and to the bottom (29) of said tank (2). The protrusions (38) create a gap (7) smaller than 2.5 millimeters between the bottoms (39) of said cooling flasks (3) to the bottom (29) of said tank (2) and between the lateral walls (33) of said cooling flasks (3) to the longitudinal walls (24) of said tank (2). The gaps (7) constitute a space that serves as part of said single cooling space (6).

In additional version of the first embodiment of the apparatus (1) each of the longitudinal walls (24) and the bottom (29) of the tank (2) has at least one protrusion (38) smaller than 2.5 millimeters. The cooling flasks (3) are designed to be set within the tank (2) in such a way that said protrusions (38) are attached to the lateral walls (33) and the bottoms (39) of said cooling flasks (3). The protrusions (38) create a gap (7) smaller than 2.5 millimeters between the bottoms (39) of said cooling flasks (3) to the bottom (29) of said tank (2) and between the lateral walls (33) of said cooling flasks (3) to the longitudinal walls (24) of said tank (2). The gaps (7) constitute a space that serves as part of said single cooling space (6).

Figure 8:
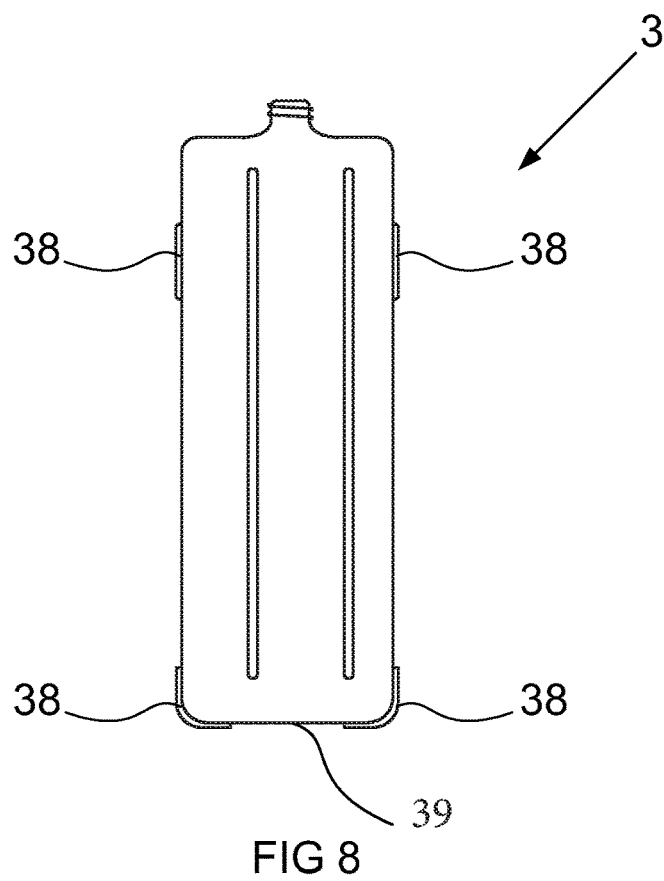
FIGS. 8-10 depict the cooling flask (3) with protrusions (38) on its bottom (39), on its lateral walls (33) and on its longitudinal walls (32).
Figure 9:
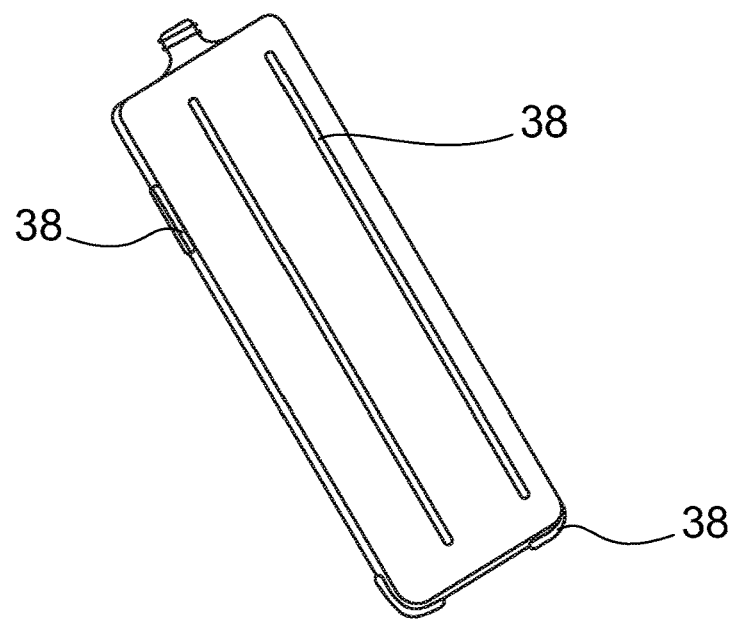
Figure 10:
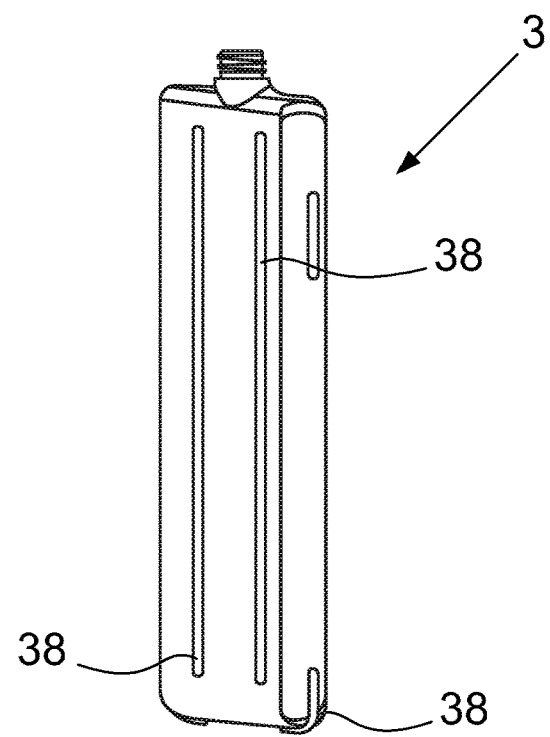
Figure 11:
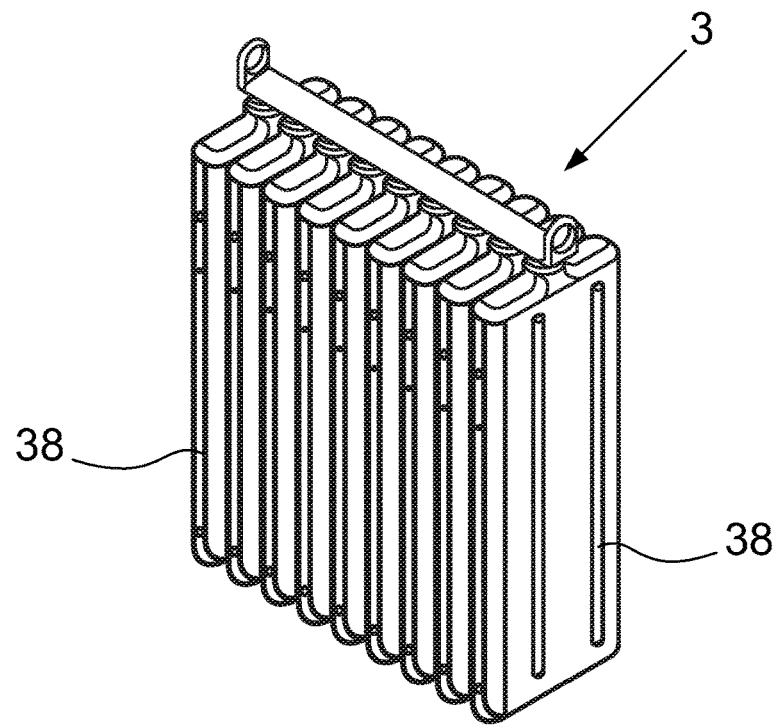
FIG. 11 depicts several cooling flasks (3) with protrusions (38).
Figure 12:
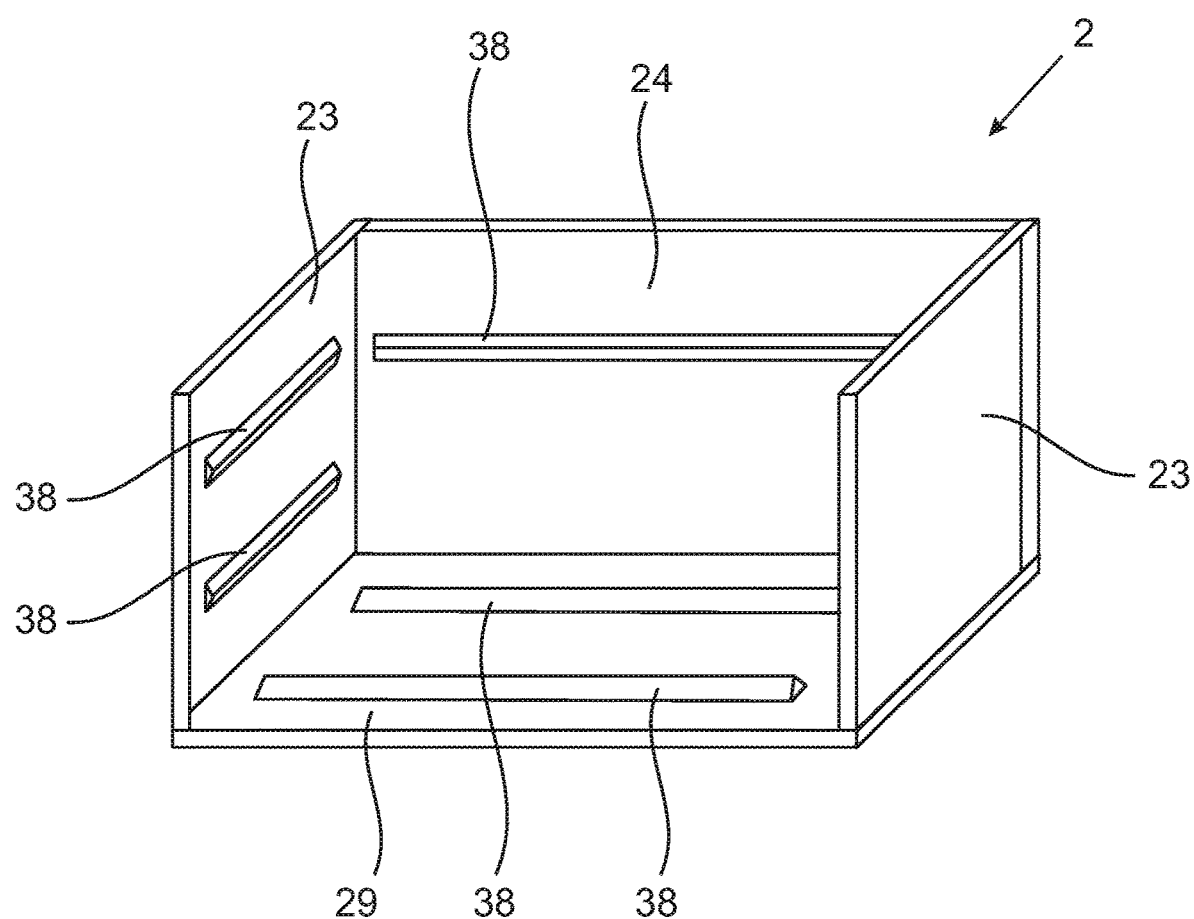
FIG. 12 is a schematic cross sectional vies of the tank (2) with protrusions (38) on its bottom (29), on its lateral walls (23) and on its longitudinal walls (24).

FIGS. 8-10 depict the cooling flask (3) with protrusions (38) on its bottom (39), on its lateral walls (33) and on its longitudinal walls (32), and FIG. 11 depicts several cooling flasks (3) with protrusions (38). FIG. 12 is a schematic cross sectional vies of the tank (2) with protrusions (38) on its bottom (29), on its lateral walls (23) and on its longitudinal walls (24).

What is claimed is:

1. An apparatus for cooling liquids, comprising: a tank and cooling flasks;
    wherein said tank has two longitudinal walls, two lateral walls, a bottom and a top opening; wherein each of said cooling flasks has two longitudinal walls, two lateral walls and a bottom; wherein said cooling flasks are designed to contain coolant material;
    wherein the lateral walls and at least one longitudinal wall, of each of said cooling flasks, has at least one protrusion smaller than 2.5 millimeters;
    wherein said cooling flasks are designed to be set within the tank in such a way that said protrusions are attached to the longitudinal walls of said tank;
    wherein said protrusions create a gap smaller than 2.5 millimeters between each two adjacent cooling flasks and between the lateral walls of said cooling flasks to the longitudinal walls of said tank, wherein said gaps constitute a single cooling space;
    wherein a total volume of the cooling flasks is three times greater or more than a total volume of the single cooling space; and whereby when a user pours hot water into the single cooling space then the coolant material within said cooling flasks absorbs heat from said hot water.

2. An apparatus for cooling liquids, comprising: a tank and cooling flasks;
    wherein said tank has two longitudinal walls, two lateral walls, a bottom and a top opening; wherein each of said cooling flasks has two longitudinal walls, two lateral walls and a bottom; wherein said cooling flasks are designed to contain coolant material;
    wherein each of said longitudinal walls of said tank, and at least one longitudinal wall of each cooling flasks, has at least one protrusion smaller than 2.5 millimeters;
    wherein said cooling flasks are designed to be set within the tank in such a way that said protrusions are attached to the lateral walls of said cooling flasks;
    wherein said protrusions create a gap smaller than 2.5 millimeters between each two adjacent cooling flasks and between the lateral walls of said cooling flasks to the longitudinal walls of said tank, wherein said gaps constitute a single cooling space;
    wherein a total volume of the cooling flasks is three times greater or more than a total volume of the single cooling space; and whereby when a user pours hot water into the single cooling space then the coolant material within said cooling flasks adsorbs heat from said hot water.

3. An apparatus for cooling liquids, comprising: a tank and cooling flasks;
    wherein said tank has two longitudinal walls, two lateral walls, a bottom and a top opening; wherein each of said cooling flasks has two longitudinal walls, two lateral walls and a bottom; wherein said cooling flasks are designed to contain coolant material;
    wherein at least one longitudinal wall of each of said cooling flasks has at least one protrusion smaller than 2.5 millimeters;
    wherein the cooling flasks are designed to be set within the tank in such a way that said protrusions create a gap smaller than 2.5 millimeters between each two adjacent cooling flasks, wherein said gaps constitute a single cooling space;

wherein a total volume of the cooling flasks is three times greater or more than a total volume of the single cooling space; and whereby when a user pours hot water into the single cooling space then the coolant material within said cooling flasks absorbs heat from said hot water.

4. An apparatus for cooling liquids, comprising: a tank and cooling flasks;
   wherein said tank has two longitudinal walls, two lateral walls and a top opening; wherein each of said cooling flasks has two longitudinal walls and two lateral walls; wherein said cooling flasks are designed to contain coolant material;
   wherein each of said longitudinal wall of said tank has recesses wherein each of said recesses match a shape of said lateral walls of said cooling flasks; wherein each of said cooling flasks is designed to be fixed inside the tank by attaching the lateral walls of each cooling flasks to corresponding recesses from said recesses;
   wherein the cooling flasks are designed to be set within the tank in such a way that a gap smaller than 2.5 millimeters is formed between each two adjacent cooling flasks, creating a cooling space; wherein a total volume of the cooling flasks is three times greater or more than a total volume of the cooling space; and whereby when a user pours hot water into the single cooling space then the coolant material within said cooling flasks adsorbs heat from said hot water.

5. The apparatus for cooling liquids according to claim 4 wherein said lateral walls and at least one longitudinal wall, of each of said cooling flasks, has at least one protrusion smaller than 2.5 millimeters;
   wherein said cooling flasks are designed to be set within the tank in such a way that said protrusions are attached to the longitudinal walls of said tank;
   wherein the protrusions create a gap smaller than 2.5 millimeters between the lateral walls of said cooling flasks to the longitudinal walls of said tank; and wherein the gaps constitute a space that serves as part of said single cooling space.

6. The apparatus for cooling liquids according to claim 4 wherein each of said longitudinal walls of said tank has at least one protrusion smaller than 2.5 millimeters;
   wherein said cooling flasks are designed to be set within the tank in such a way that said protrusions are attached to the lateral walls of said cooling flasks;
   wherein the protrusions create a gap smaller than 2.5 millimeters between the lateral walls of said cooling flasks to the longitudinal walls of said tank; and wherein the gaps constitute a space that serves as part of said single cooling space.

* * * * *